Sept. 12, 1967   W. W. WOODS ETAL   3,341,354
CURTAIN COATING METHOD AND APPARATUS FOR APPLYING A
NON-UNIFORM LIQUID COATING MATERIAL TO SHEET STOCK
Filed March 11, 1964
2 Sheets-Sheet 1

INVENTORS
WARREN W. WOODS,
TRAVIS L. GORDY &
IRWIN POLITZINER

ATTORNEY

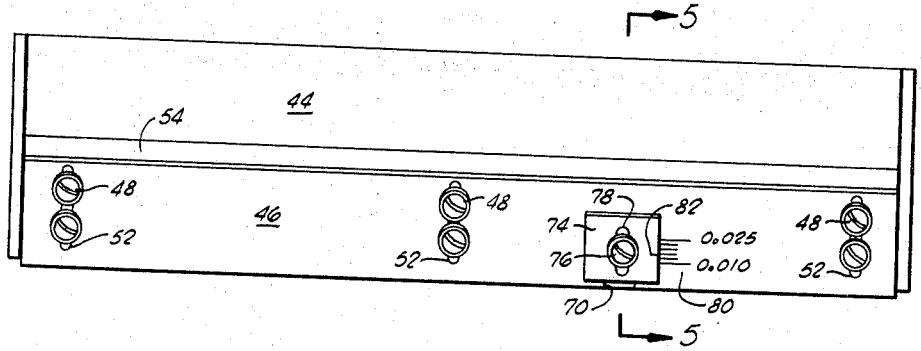
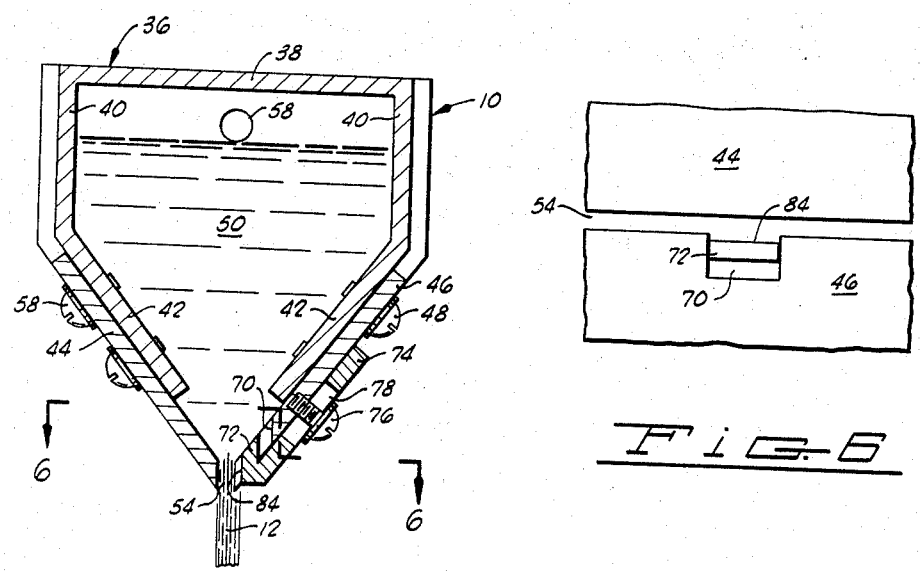

United States Patent Office 3,341,354
Patented Sept. 12, 1967

3,341,354
CURTAIN COATING METHOD AND APPARATUS FOR APPLYING A NON-UNIFORM LIQUID COATING MATERIAL TO SHEET STOCK
Warren W. Woods and Travis L. Gordy, Ponca City, Okla., and Irwin Politziner, Brigham City, Utah, assignors to Continental Oil Company, Ponca City, Okla., a corporation of Delaware
Filed Mar. 11, 1964, Ser. No. 351,000
8 Claims. (Cl. 117—105.3)

ABSTRACT OF THE DISCLOSURE

A curtain coating machine which includes a hollow coating head having an elongated slot therein for dispensing a gravitating curtain of a liquid coating material. At a position on at least one side of the slot there is formed a notch to create a transverse enlargement whereby a larger amount of the coating material flows through the notch than flows through the remaining length of the slot.

---

In the manufacture of cartons of fibrous material such as paper, it is often desirable to coat the stock from which such cartons are made with a water repellent or water resistant composition. Such compositions are well known in the art and frequently include natural or synthetic waxes, and may also include various synthetic resin or polymeric materials such as polyethylene and copolymers of polyethylene with various other well known synthetic thermoplastic substances. One of the most widely used procedures for applying coating compositions of the type described to flat carton stock is to pass the stock through a vertically extending, gravitating curtain of the coating composition so that the composition is laid down on the surface of the stock in a thin uniform layer as the stock is passed therethrough.

The chemical and physical properties of the coating which is applied to a particular fibrous stock are of substantial importance relative to the use made of such stock, and the effectiveness with which the stock may be used in its intended applications. For example, where the stock is to be used in fabricating cartons used to contain liquids such as milk or fruit juice, or to contain frozen foods, the coating material must be effective to substantially reduce the moisture permeability of the fibrous stock and is also relied upon to substantially improve the tensile strength and other mechanical properties of the carbon to some extent when it is dry, or, more frequently, when it has been subjected to contact with liquids or moisture over an extended period of time.

The functional requirements of the coating which is applied to the stock may vary from one location to another on the carton or container made from the stock. For example, on the side panel of milk cartons, the fibrous or paper stock is not bent at this location and the coating must primarily function only as a good water and moisture barrier. Thus, at this location on the carton, a relatively thin coating, usually less than one mil in thickness, of a great many coating materials in widespread use will fulfill the functional requirements. High tensile strength and ductility are not particularly critical requirements of the coating at the described location.

On the other hand, the bottom portion of the carton or container must be bent or creased along certain fold lines during the container forming and heat sealing operation. Moreover, the folds which are formed at the bottom of the carton are subjected to constant flexing when the carton is in use, and must carry the entire weight of the contents of the carton. It is thus apparent that the coating on the area of the bottom of the carton, and particularly on the fold lines along which the blank will be folded to produce the carton, must be of high strength and ductility, and must possess especially good sealing qualities. This may be in large degree accomplish with many types of coating materials by providing a coating along and over the fold lines of the flat carton stock which is substantially thicker than the coating which is provided on the side panels and unstressed areas. The coating provides additional strength along the fold lines of the carton and helps to provide a leak-proof seal at these locations.

In order to provide a thicker layer of the coating composition along certain fold lines of the carton than is provided upon the remaining portion of the carton, any one of several "double pass" procedures may be employed where the stock is passed through the gravitating curtain of the coating composition a plurality of times in order to apply coatings to the stock which vary in thickness from one location thereon to another. In one of the multiple pass methods, a masking technique is used in which the portion to which the thin coating is to be applied is initially masked or shielded from the coating composition and a relatively thick coating is applied to the unmasked area across which extend the bend lines to which reference has been made. On the second pass, the masking material is removed from the stock and a thinner coating is applied to the previously masked areas.

It is also possible to achieve selectivity in coating thicknesses by initially passing the stock through a curtain coating machine which is designed to project the gravitating curtain into contact with only a part of the carton, and then to pass the partially coated carton through a second gravitating curtain which applies a coating of a different thickness to other selected portions of the carton.

Any of the multiple pass or double coating procedures which have heretofore been employed, however, either reduce the carton production capacity because of the additional time required for the second pass through the gravitating curtain, or raise investment cost as a result of special equipment designs.

The present invention comprises an improved curtain coating device which permits coatings of varying thicknesses to be selectively applied to adjacent localized areas on a single flat fibrous stock as the stock is passed through a gravitating curtain of the coating composition. The improved curtain coating device, in addition to permitting selective thickness coating by a single pass of the carton stock, effects a stabilization of the gravitating curtain of coating composition so that such curtain is less subject to deflection by air currents and vibration. In heretofore employed curtain coating techniques and using the equipment previously marketed for providing gravitating curtains of coating compositions, the quality of the coating applied has been frequently deleteriously affected by wavering of the gravitating curtain due to the impingement thereon of air currents and the subjection of such curtains to mechanical vibrations. These distortions and deflections of the gravitating curtain result in coatings containing pinholes and breaks, and also result in random, unintended variations in coating thickness over the entire carton surface. The present invention provides a method for stabilizing the gravitating curtain used for coating flat carton stock and the like, and the principle underlying such method is the basis for certain improvements in curtain coating devices as proposed by the present invention.

In one of its broader aspects, the improved curtain coating device of the present invention comprises a hollow coating head adapted to contain a molten or liquid coating composition which is to be applied to a fibrous stock to be coated; a pair of parallel, elongated bars forming a portion of the lower side of said coating head and defining between them an elongated slot with at least one of the bars being notched at a point intermediate its ends so that the notch effectively forms an enlargement in the longitudinal slot at one position therealong. The coating material is extruded or allowed to gravitate through the elongated slot and notch so that the gravitating curtain which is formed is characterized in having a thickened, vertically extending column of the coating composition at one point along its length. In addition to the described elements of the curtain coating device of the invention, the invention further contemplates the inclusion in combination with such elements of such conventional components of curtain coating machines as a trough or container positioned below the coating head for receiving the gravitating curtain of coating composition, and a pair of conveyors positioned on opposite sides of the gravitating curtain for moving carton stock and the like through the gravitating curtain in a plane extending through the curtain between the coating head and trough.

In the utilization of the described apparatus, a flat blank or sheet of fibrous stock from which a carton is to be fabricated is passed through the gravitating curtain of coating composition with at least one of the fold lines of the stock positioned so as to pass directly beneath the notch in one of the slot-defining bars. In this way, a thicker layer of the coating composition is deposited on the stock along the fold lines with the result that a carton of superior mechanical properties and better durability and service life may be fabricated therefrom. Moreover, the development of the relatively thick column of the coating composition in the gravitating curtain has the effect of anchoring or stabilizing the curtain and lessening its susceptibility to deflection by wind currents and vibration. This stabilization of the gravitating curtain in turn enables a more uniform and defect-free coating to be laid down on the exposed surface of carton stock as it passes through the curtain. In another of its aspects, the present invention provides a novel method for improving the stability of a gravitating curtain of a liquid coating composition so that the deposition of the composition on the exposed surface of a flat blank moved through the curtain may be more efficiently accomplished. In stabilizing the curtain against deflections resulting from the impingement of air currents, vibration and, to some extent, varying thermal gradients, the coating which is deposited on carton stock passed through the curtain is more uniform and is relatively free of pinholes, blisters and other defects as compared to cartons coated using a gravitating curtain not stabilized by using the method of the present invention.

From the foregoing discussion of the invention, it will be apparent that it is a major object of the present invention to provide an improved curtain coating device for applying in the liquid state, a coating composition to the surface of paper carton stock or other flat stocks of similar material.

A further object of the present invention is to provide a more economical method of applying to the fold lines of carton stock, a thicker layer of coating composition than is applied to the remainder of the stock.

Another object of the present invention is to provide an improved method for stabilizing a gravitating curtain of a liquid coating composition against deflection and wavering as a result of mechanical vibrations, thermal gradients and the impingement on the curtain of air currents.

Yet another object of the present invention is to improve existing curtain coating machines so that these machines may be employed to selectively apply coatings of varying and predetermined thicknesses upon pre-selected areas of flat carton stock as the stock is passed in a single pass through the curtain developed by such machines.

In addition to the foregoing described objects and advantages of the present invention, other objects and advantages will become manifest from the following detailed description of the invention as such description is considered in conjunction with a perusal of the accompanying drawings which illustrate the invention.

In the drawings:

FIGURE 4 is a view in elevation of one side of a coating head which may be employed in a modified embodiment of the invention.

FIGURE 5 is a view in section taken along line 5—5 of FIGURE 4.

FIGURE 6 is a view in section taken approximately along line 6—6 of FIGURE 5.

Figure 1:
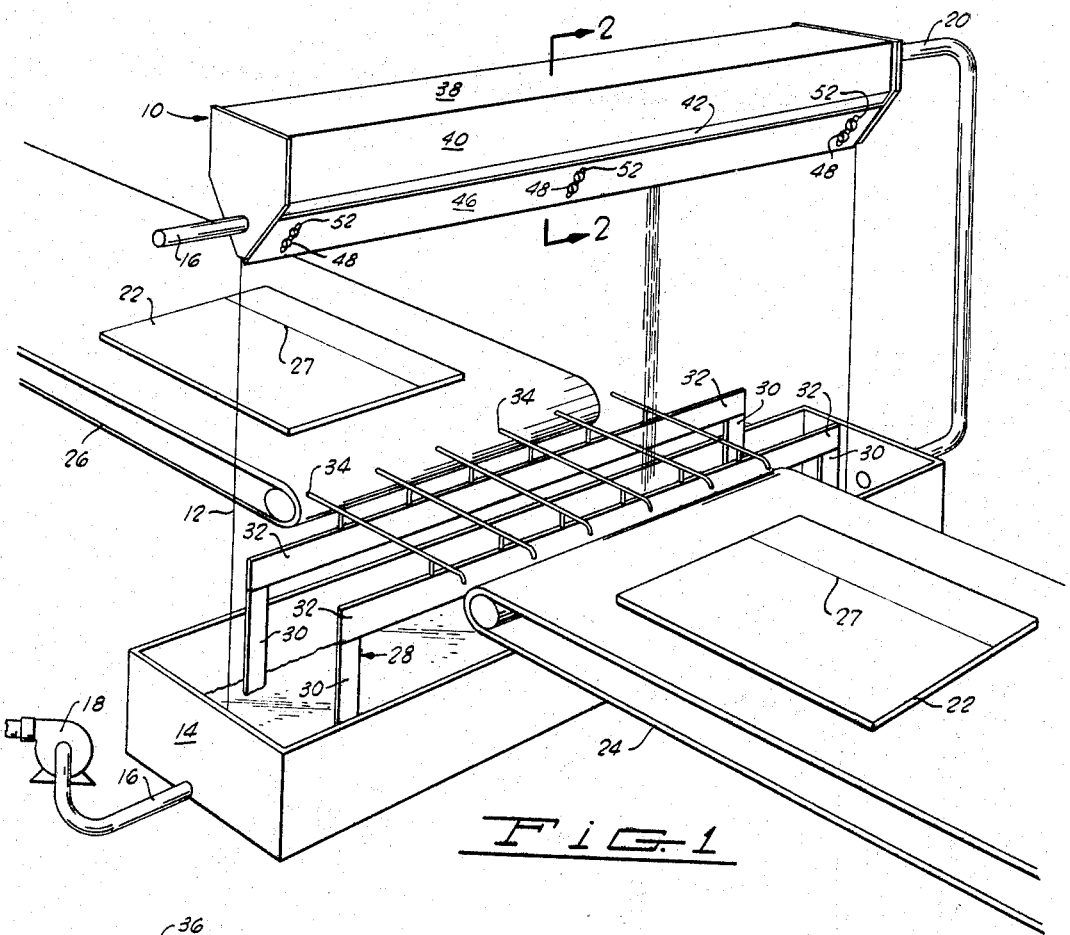
FIGURE 1 is a partially schematic perspective view of an improved curtain coating apparatus constructed in accordance with the present invention.

Referring now to the drawings in detail, and particularly to FIGURE 1, there is illustrated a curtain coating apparatus such as that typified by a Steinemann curtain coater, but including the improvements of the present invention. The curtain coating apparatus includes a hollow coating head designated generally by reference character 10 which is adapted to contain a molten coating composition. The coating composition gravitates or is extruded under pressure through a slot in the bottom of the coating head 10 and descends as a thin vertical curtain 12 into a suitable receiver, such as an elongated trough 14 disposed directly below the coating head. The liquid coating composition is circulated from the trough 14 back to the coating head 10 by means of a conduit 16 in which is interposed a suitable pump 18. The surface of the liquid coating composition in the coating head 10 is maintained below a certain level by the use of an overflow conduit 20 shown in FIGURE 1 as entering one end of the coating head. In many commercially available coating machines, air under superatmospheric pressure is introduced to the coating head 10 over the liquid coating composition by apparatus (not shown) for the purpose of providing an extruding force.

For the purpose of conveying flat or sheet stock 22 of paper or other fibrous material through the curtain 12 of the coating composition, a pair of feed and discharge conveyors, 24 and 26, respectively, are disposed on opposite sides from the curtain 12 and are usually positioned in a common horizontal plane so that the stock is passed through the curtain 12 in a direction normal thereto. Where the stock is to be folded into cartons, it will have one or more fold lines 27 extending thereacross.

Due to the flexibility of some relatively thin fibrous stocks which it may be desired to coat, it is desirable to provide a supporting structure designated generally by reference character 28 to support the stock as it passes across the gap between the conveyors 24 and 26. The supporting structure 28 will generally comprise a plurality of legs 30 which extend vertically with their lower ends in contact with the bottom of the trough 14, a pair of horizontal connecting members 32 for interconnecting the legs 30, and a suitable grate structure such as a plurality of spaced, horizontally disposed parallel wires 34 as illustrated in FIGURE 1. Suitable supporting structures of this general type are described in United States Patent No. 3,307,516, issued Mar. 7, 1967, which is assigned to the assignee of the present invention.

With the exception of the supporting structure 28, the various elements of the curtain coating apparatus thus far described are, in general, those which are commonly encountered in conventional curtain coating devices now commercially available. The present invention relates to certain novel improvements in the structure thus described which permit the hereinafter described improved method of coating fibrous carton stock and the like to be more effectively performed.

Figure 2:
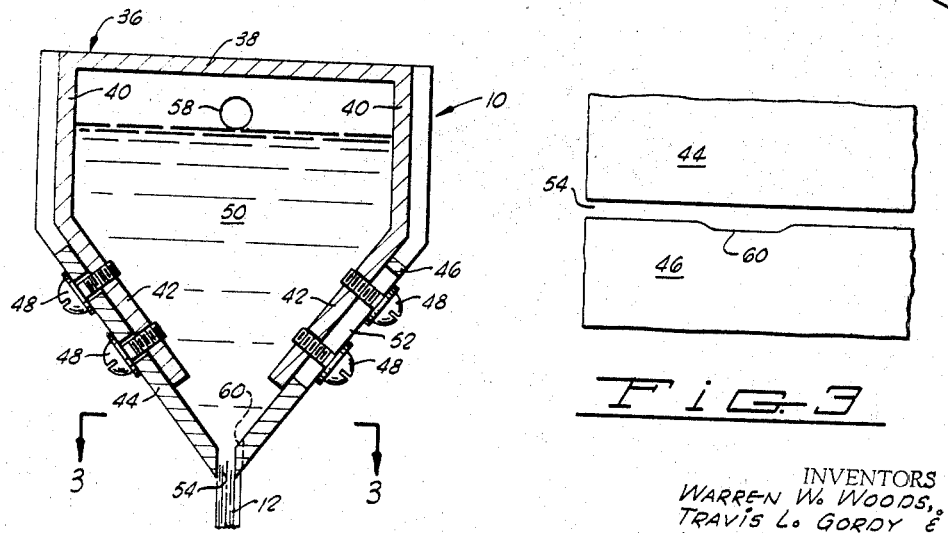
FIGURE 2 is a sectional view taken along line 2—2 of FIGURE 1.

In describing the improved curtain coating apparatus of the present invention, reference is initially made to FIGURE 2 of the drawings which is a sectional view taken along line 2—2 of FIGURE 1. In referring to this figure of the drawings, it will be perceived that the coating head 10 comprises a housing 36 which is shaped in cross section as an open quadrilateral. The housing 36 thus has a top 38, a pair of opposed, parallel side walls 40 and two opposed lower side walls 42 which converge toward each other but do not intersect or meet at their lower edges. A pair of elongated bars or blades 44 and 46 are secured to the lower side walls 42 of the housing 36 by suitable bolts 48. The transverse width of the bars 44 and 46 is sufficiently large that the bars overlap the lower side walls 42 for a considerable distance and thereby provide a sufficient seal against loss of a coating composition 50 contained within the coating head 10. If desider, a sealing gasket (not illustrated) or other suitable sealing structure may be provided between the bars 44 and 46 and the lower side walls 42 to further improve the seal between these elements.

As best illustrated in FIGURE 2, and as also shown in FIGURE 1, the bar 46 is provided with three transversely extending slots 52 which are located at the ends and the center of the bar, respectively, and receive the shanks of the bolts 48 which attach the bar 46 to its respective lower side wall 42. The heads of the bolts 48 are larger than the slots 52 so that the bar 46 may be fixed in a set position relative to the bar 44 by tightening the bolts 48. The transverse slots 52 facilitate the adjustment of the spacing of the bar 46 from the bar 44 so that a narrow, elongated slot 54 which is defined between the convergent edges of the bars 44 and 46 may be adjusted in its width. In other words, the thickness of the curtain 12 of coating material which is illustrated in FIGURE 1 may be adjusted by loosening the bolts 48 which secure the bar 46 to its respective lower side wall 42 and then adjusting the bar 46 toward or away from the bar 44 as may be desired.

As is well understood by those skilled in the use of curtain coating machines of the general type described, the coating composition 50 is contained in the coating head 10 in the manner illustrated in FIGURE 2 and is usually placed under a slight positive or superatmospheric pressure by injecting air or an inert gas into the void space between the surface of the coating composition and the top 38 of the housing 36. The existence of the void space is maintained by the provision of the overflow conduit 20, the opening of which is designated by reference character 58 in FIGURE 2. In the operation of the device, the coating composition 50 is thus propelled or forced from the coating head 10 by a slight positive pressure acting downwardly on the composition and thus may be said to be extruded from the coating head. This is particularly advantageous in the case of very viscous coating compositions such as blends of wax and synthetic resin of the type hereinafter described. The pressure which is imposed upon the coating composition will not generally need to exceed about 50 p.s.i.g. and will usually be substantially lower.

As has been hereinbefore discussed, one of the disadvantages of curtain coating devices of the type previously available is that such devices provide a coating composition curtain which is of substantially uniform thickness throughout its length, thereby necessitating a plurality of passes of the carton stock through the gravitating curtain when it is desired to vary the thickness of the coating imposed upon certain localized areas of the stock. For example, where it is desired to apply a water repellent coating to flat fibrous stock from which milk or frozen food cartons are to be fabricated, it is generally necessary to make more than one pass of the carton through the curtain 12 in order to deposit a thicker and therefore mechanically stronger coating upon the lines along which the stock will be folded to make the cartons.

Figure 3:
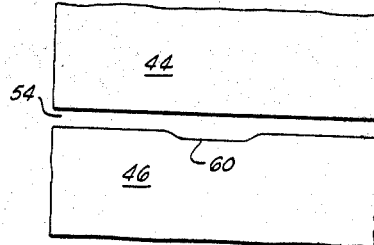
FIGURE 3 is a view in section taken along line 3—3 of FIGURE 2.

In order to provide a curtain coating device which successfully overcomes the necessity of such plural passages of the stock through the gravitating curtain of coating composition, the present invention includes as one of the bars 44 or 46, an elongated member which has been cut away or machined out at one of its longitudinal edges to define a notch of the general shape illustrated in FIGURE 3 and designated by reference character 60. The notch 60 may be formed in either the bar 46 or the bar 44 or in both bars, but by way of example, is illustrated in FIGURES 2 and 3 as being formed in the movable bar 46. The precise location and dimensions of the notch 60 will be dictated in each situation by the thickness of the coating which it is desired to apply to the line along which the flat carton stock is to be folded, the particular distance upon each side of the fold line over which it is preferred to apply the thickened coating and the path along which the stock will move as it passes through the gravitating curtain 12. The notch 60 will, of course, always be disposed intermediate the ends of the bar or blade in which it is formed and will usually be positioned somewhere to the right or left of the center of the bar by virtue of the fact that, in most instances, the fold line of the carton to which is to be applied a coating of greater thickness will be disposed to one side or the other of the center line of the stock. Thus, for example, in the coating of milk carton stock, the fold line subjected to the most severe mechanical stress and which it is most important to coat with a coating of extra thickness is the line which marks the intersection between the bottom of a milk carton and the side walls thereof. This line will frequently be disposed anywhere from about two-thirds to about three-fourths of the way from one lateral edge of the carton stock to the other.

The longitudinal length of the notch 60 as measured along the longitudinal edge of the bar in which it is formed is determined by the width of the stripe or path of thickened coating which it is desired to superimpose over the fold line. Typically in the case of milk carton stock, this may range from about one quarter to one-half inch on each side of the fold line so that the length of the notch 60 may be from about one-half to one inch.

The depth of the notch 60 as measured from the longitudinal edge of the bar in which it is formed transversely inwardly into the bar is dictated by the thickness of the coating which it is desired to apply to a carton fold line. The effectiveness of a particular notch depth in increasing the thickness of the coating laid down upon a carton fold line is, to a substantial degree, dependent upon the viscosity of the particular coating composition which is in use. However, the depth of the notch 60 may be generally correlated to the increase in thickness which results in the coating imposed on the portion of the stock passed directly beneath the notch. Thus, in our use of the improved curtain coating device of the invention we have found that in milk carton coating operations using a paraffin wax-synthetic copolymer mixture, the ratio of the thickness of the fold line coating to the coating on the remainder of the carton is generally from about 2 to about 3 times the ratio of the width of the slot 54 between the bars 44 and 46 at the notch 60 as opposed to the width of such slot 54 over the remainder of its length.

A description of an experiment which was performed in the application of a water repellent coating to milk carton stock exemplifies the effect of varying the depth of the notch 60. The elongated slot 54 defined by the two bars in a curtain coating head similar to the bars 44 and 46 shown in the drawing was 0.042 inch in transverse width. Two notches, each 1 inch wide and 0.01 inch and 0.02 inch in depth, respectively, were milled into the movable blade intermediate the ends thereof and spaced from each other therealong.

A wax-copolymer mixture was then extruded through the elongated slot to form a gravitating curtain of the type hereinbefore described. The coating composition consisted of (by weight)

38% ethylene-vinyl acetate copolymer containing from about 30 to 35 percent by weight vinyl acetate and having a melt index of from about 20 to about 30
30% paraffin wax (melting point 126° F.–129° F.)
30% recrystallized microcrystalline wax
2% low molecular weight polyethylene The curtain produced by extrusion of the coating composition through the elongated slot fell approximately 10 inches to the plane of movement of the milk carton stock. Cartons were then fed through the curtain with a portion of each stock passing beneath each of the notches described above. The result of the coating operations described was that two strips were laid down on each stock which were of a thicker dimension than the coating applied to the remainder of the stock. The strip resulting from the use of the 0.01 inch notch was 0.0044 in thickness, the strip resulting from the 0.02 inch notch was 0.0097 inch in thickness and the non-stripped area which resulted from the extrusion of the coating composition through the normally spaced bars (where not notched) was 0.0015 inch in thickness.

A final consideration relative to the notch 60 should be noted. We have determined that more effective coating applications are obtained when the defined edges of the notch 60 do not terminate in sharp or abrupt corners. Thus, radiusing or tapering of the sides and corners of the notch 60 as illustrated in FIGURE 3 of the drawings is preferred.

It is believed that the manner of utilization of the invention will have now become manifest. By way of summary, however, it may be stated that the stock 22 is oriented on the feed conveyor 24, and that the notch 60 is positioned in one or both of the bars 46 or 48 so that as the stock 22 is conveyed through the gravitating curtain 12 by the conveyors 24 and 26, the fold line (or fold lines, where a plurality of thickened coating zones are to be developed) is aligned with and passes through the thickened portion of the curtain 12 developed as a result of the notch 60.

A modified embodiment of the invention is illustrated in FIGURES 4, 5 and 6. As best illustrated in FIGURES 5 and 6, a notch 70 of substantial depth is milled in one of the bars 44 or 46, the movable bar 46 being utilized as previously described. The notch 70 is of substantially greater depth than the notch 60 shown in the FIGURE 3 embodiment and receives the foot portion 72 of a plate 74 which is slidably or adjustably mounted on the bar 46 using a bolt 76 and slot 78 arrangement similar to that used to facilitate the adjustment of the position of the bar 46 on its respective lower side wall 42. A graduated scale 80 and index marker 82 are provided on the bar 46 and plate 74, respectively, so that the precise degree of movement of the plate 74 and its associated toe portion 72 may be known during its adjustment.

In referring to FIGURE 5, it will be perceived that the toe portion 72 of the plate 74 carries a face 84 which extends parallel to the adjacent edge of the bar 44, and that in the adjusting movement of the plate 74, the opposed faces of the bar 44 and plate 74 remain in parallelism. This prevents any distortion of the curtain 12 which might otherwise occur as a result of the formation of irregularities in the slot 54 resulting from adjustment of the position of the plate 74.

From the foregoing description of the modified embodiment illustrated in FIGURES 4, 5 and 6, it will now be understood that the function of the adjustable plate 74 and its associated toe portion 72 is to permit the effective depth of the notch 70 formed in the bar 46 to be varied. In other words, by varying the distance between the face 84 of the toe portion 72 and the parallel opposing face of the bar 44, the increase in the thickness of the curtain 12 in its portion aligned with the notch 70 may also be varied. The ultimate result of the arrangement is that the thickness of coating material superimposed upon a fold line or other localized area of carton stock passing through the curtain may be varied as desired.

As hereinbefore discussed, the improved curtain coating apparatus of the present invention enables the effective and more economical application of coatings of differing thicknesses to localized areas of a single flat or sheet stock passed through the curtain of coating composition. We have also surprisingly discovered, however, that the development of a curtain 12 of coating composition of the type depicted in FIGURE 1, wherein the curtain contains a vertically extending column of coating composition which is of relatively greater thickness than the remainder of the curtain, is more stable than those curtains which are of uniform thickness throughout their width and do not contain such columns. In other words, we have observed that the inclusion in the curtain 12 of the coating composition of one or more vertically extending, relatively narrow columns having a greater thickness than the average or mean thickness of the remainder of the curtain tends to stabilize the curtain against deflection by wind currents, mechanical vibrations and distortions arising therein due to uncontrolled thermal gradients. A precise explanation for such stabilizing effect cannot be advanced and an exposition of theory will not be undertaken. However, repeated tests of the improvement in stability imparted to the curtain by the development therein of thickened columns of the type described have shown that the coatings deposited on flat, fibrous stock passed through the curtain are generally more uniform in thickness, and are relatively free of pinholes, fissures and other deformities or defects as compared to stocks which are passed through unstabilized curtains—that is, curtains not having the thickened columns of coating composition formed therein. Where there is no particular need for, or desirability in, imparting a thicker coating to a local area of the stock, such as along a fold line, the thickened column may be formed at or adjacent each end of the gravitating curtain 12 by the provision of notches in one or both of the bars 44 and 46 at these locations. The stock is then passed between the thickened columns of coating composition and emerges from the discharge conveyor 26 with a substantially improved coating of relatively uniform thickness throughout. It will be apparent, of course, that several of the thickened columns of coating composition may be formed in the curtain 12 and the employment of a greater number of such columns may be increasingly desirable as the overall length of the curtain from one end thereof to the other increases.

Although the present invention has been described with a certain degree of particularity and detail, it is to be understood that certain changes and modifications may be made in the described structure, and in the method of stabilizing the gravitating curtain of coating composition, without departure from the basic principles which underlie the invention and which have been herein disclosed. Changes of this type are therefore intended to be considered within the spirit and scope of the invention except as the same may be necessarily limited by the appended claims or reasonable equivalents thereof.

We claim:
1. In a curtain coating machine of the type having a hollow coating head provided with an elongated slot therein for dispensing a gravitating curtain of a liquid coating material, and a pair of elongated, rigid members extending generally parallel to, and spaced from, each other to define said slot, the improvement which comprises one of said bars having a notch therein forming a transverse enlargement of said slot whereby a larger amount of said liquid coating material is dispersed through said slot at the location of said notch than over the remaining length of said slot.

2. A curtain coating machine for coating flat carton stock and the like comprising:
a hollow coating head for containing a liquid coating material, said coating head including slot defining means at the lower side of said head defining a horizontally extending, elongated slot for dispensing a gravitating curtain of said liquid coating material, and further including adjustable means for adjusting the transverse width of said slot over a portion of its length whereby the thickness of said curtain may be locally varied;

a trough positioned below the coating head for receiving the coating composition; and a pair of conveyors positioned on opposite sides of the gravitating curtain for moving the flat stock through the gravitating curtain in a plane extending through the curtain between the coating head and the trough.

3. A curtain coating machine as claimed in claim 2 wherein said slot defining means comprises a pair of spaced, parallel bars, one of said bars having a portion thereof which faces the other of said bars cut away to increase the width of the slot defined between said bars at said cut away portion, and wherein said adjustable means includes a plate adjustably mounted on the bar having said cut away portion and positioned adjacent said cut away portion for movement toward and away from said other bar to permit variation in the width of the slot between said bars at said cut away portion.

4. Curtain coating apparatus for applying a coating composition consisting essentially of a paraffin wax and synthetic resin to flat, fibrous stock adapted to be folded along lines into cartons comprising:

a hollow coating head for containing said blend in a liquid state;

a first elongated, horizontally extending blade forming a portion of the bottom of said coating head;

a second elongated, horizontal blade forming a portion of the bottom of said coating head, extending parallel to said first blade and spaced therefrom to define an elongated horizontal slot therebetween, one of said blades having a generally rectangular notch therein facing the other of said blades and positioned intermediate the ends thereof, said notch having a depth as measured inwardly from the notched edge of said one blade which is from about $\frac{1}{5}$ to about $\frac{1}{2}$ the width of the slot between said blades along the remainder of the length thereof;

a trough positioned below the coating head for receiving the coating composition; and a pair of conveyors positioned on opposite sides of the gravitating curtain for moving the flat stock through the gravitating curtain in a plane extending through the curtain between the coating head and the trough and positioned at least 10 inches below said coating head.

5. Curtain coating apparatus as claimed in claim 4 wherein said second blade is movable relative to said first blade for reducing the width of the slot between said blades, and wherein said curtain coating apparatus is further characterized to include means for adusting the depth of said notch.

6. The method of selectively coating with a moisture resistant material, flat fibrous stock having fold lines therein comprising:

forming a vertically extending, gravitating curtain of molten coating material with said curtain being of lesser thickness over a major portion of its width as said thickness is measured in a direction normal to said curtain than at least one relatively thicker minor portion of said curtain located intermediate the ends thereof; and passing said stock through said curtain in a direction normal to the vertical plane of said curtain with at least one of the fold lines of said stock passing through said thicker portions of said curtain whereby a thicker layer of coating material is laid down upon the fold lines of said stock than on the remainder thereof.

7. In a curtain coating process in which flat, fibrous stock is passed through a gravitating curtain of liquid material of substantially uniform thickness, which curtain occupies a vertical plane and is at least 10 inches in width and 10 inches in height, the improvement which comprises stabilizing said curtain by forming at least one vertically extending column of said liquid material in and coplanar with said curtain with said column having a greater thickness than the thickness of said curtain.

8. A method as claimed in claim 7 wherein one of said columns is formed at each end of said curtain.

References Cited

UNITED STATES PATENTS 2,274,432 2/1942 Repsher et al. _____ 118—302 X
3,074,374 1/1963 Burkle _____ 118—302 X ALFRED L. LEAVITT, *Primary Examiner.*

J. H. NEWSOME, *Assistant Examiner.*